United States Patent [19]

Mizusawa

[11] Patent Number: 4,691,623
[45] Date of Patent: Sep. 8, 1987

[54] VENTILATOR DEVICE FOR VEHICLE
[75] Inventor: Akira Mizusawa, Yokohama, Japan
[73] Assignee: Nifco Inc., Yokohama, Japan
[21] Appl. No.: 898,960
[22] Filed: Aug. 21, 1986
[30] Foreign Application Priority Data Aug. 27, 1985 [JP] Japan .......................... 60-129520[U]

[51] Int. Cl.⁴ ............................................... B60H 1/24
[52] U.S. Cl. ...................................... 98/2.18; 98/114; 137/512.15; 137/846
[58] Field of Search ........................... 98/2, 2.18, 114; 137/512.15, 846

[56] References Cited

U.S. PATENT DOCUMENTS 2,764,078  9/1956  Tell ............................................. 98/2
3,392,654  7/1968  Grenier ............................. 98/2.18 X
4,345,510  8/1982  Sterrett ..................... 98/2 X
4,407,187  10/1983  Horney ..................... 98/114 X
4,524,805  6/1985  Hoffman ............................. 137/846

FOREIGN PATENT DOCUMENTS 63221  4/1984  Japan ..................... 98/2.18

Primary Examiner—Albert J. Makay
Assistant Examiner—Steven E. Warner
Attorney, Agent, or Firm—Trexler, Bushnell, Giangiorgi & Blackstone, Ltd.

[57] ABSTRACT

A ventilator device for a vehicle comprises a ventilation frame including a shutter-like grille and a side wall rearwardly extending therefrom and a valve member including a bill-shaped check valve projecting toward the grille. An end of the periphery of the valve member is engaged with an end of the side wall.

3 Claims, 10 Drawing Figures

VENTILATOR DEVICE FOR VEHICLE

FIELD OF THE INVENTION AND RELATED ART STATEMENT

This invention relates to a ventilator device for a vehicle for venting air from the interior of the vehicle.

FIGS. 1 and 2 illustrate a prior art ventilator device for a vehicle. This ventilator device comprises a plastic ventilator frame 3 including a shutter-like grille 1 and a side wall 2 and a frame-like valve member 5 made of rubber mounted on the rear end of the side wall 2 and provided with check valves 4 for permitting air in the interior of the vehicle to be exhausted through the grille 1 to the outside of the vehicle. The check valves 4 of the valve member are constituted by a plurality of ventilation holes 6 which are normally closed by rubber flaps 7 provided on the front side of the valve member 5. Reference numeral 8 designates a metal plate having openings 9 communicating with the ventilation holes 6 of the valve member 5.

To assemble this ventilator device, mounting pins 10 projecting from the rear end of the side wall 2 are inserted through holes 11 of the valve member 5. Then the metal plate 8 is placed over the valve member 5 and the mounting pins 10 are inserted through holes 12 of the metal plate 8. Then the projecting ends of the pins 10 are thermally deformed and enlarged, whereby the valve member 5 is held in close contact with the rear end of the side wall 2 by the metal plate 8. The ventilator device which is assembled in this way is secured to a door pillar 14 of a vehicle by screws 13 inserted from the front side of the grille 1.

With this ventilator device, the metal plate is required for mounting the valve member. Therefore, there are a large number of components, and the operation of assembling is rather cumbersome.

Further, since flaps are used as check valves, the flaps are liable to open by their own weight when the vehicle is tilted. In this case, rain water is liable to find its way into the vehicle through the ventilation holes of the valve member. Further, in a cold district, water drops are liable to condense on the flaps. In this case, the flaps become heavier so that they cannot easily open. Further, the free ends of the flaps are liable to be frozen to the surface of the valve member so that it will not open at all.

OBJECT AND SUMMARY OF THE INVENTION

An object of the invention is to provide a ventilator device for a vehicle, which comprises only two separate components and can be quickly assembled and mounted by a single action without need of any special tool.

According to the invention, there is provided a ventilator device for a vehicle, which comprises a ventilation frame including a shutter-like grille and a side wall rearwardly extending therefrom and a frame-like valve member mounted in the side wall and including a check valve for venting air from the interior of the vehicle to the outside thereof through the grille, and in which the valve member has a bill-shaped check valve projecting toward the grille, and an end of the periphery of the valve member and an end of the side wall are provided with respective engagement means engaged with each other.

Thus, according to the invention the mounting metal plate in the prior art ventilator device can be dispensed with. Besides, the ventilation frame and valve member can be assembled together by a single action by merely fitting together the end of the periphery of the valve member and the end of the side wall, i.e. by causing engagement between the respective engagement means. Further, when the ventilator device is mounted in the vehicle, the bill-shaped check valve is normally closed, thus preventing rainwater and the like from entering the vehicle interior. The bill-shaped check valve is opened to vent air from the vehicle interior when and only when the pressure in the vehicle interior becomes higher than the outside pressure.

The above and other objects and features of the invention will become more apparent from the following description with reference to the accompanying drawings.

DETAILED DESCRIPTION OF THE PREFERRED EMBODIMENT

Figure 1:
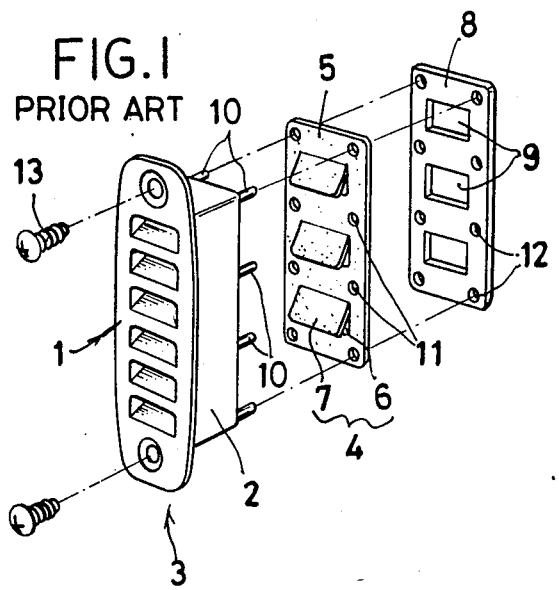
FIG. 1 is an exploded perspective view showing a prior art ventilator device for a vehicle.
Figure 2:
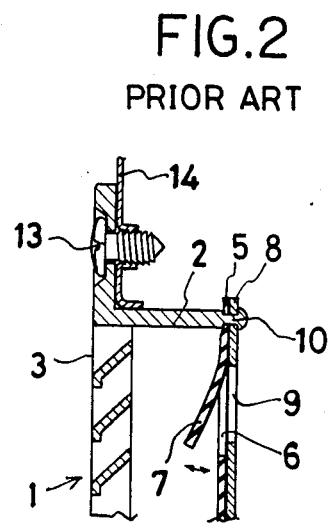
FIG. 2 is a fragmentary sectional view showing the prior art ventilator device of FIG. 1 in a state mounted on a vehicle.
Figure 3:
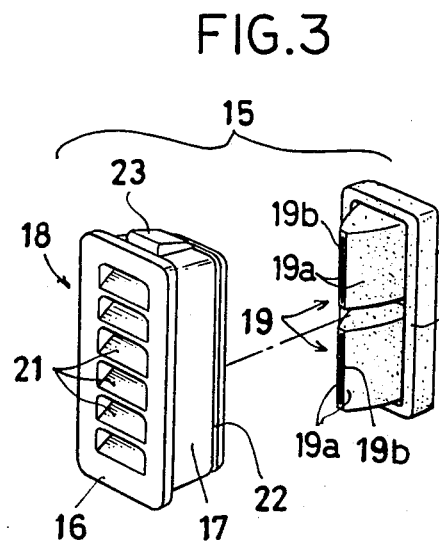
FIG. 3 is an exploded perspective view showing an embodiment of the ventilator device for a vehicle according to the invention.

Referring to FIGS. 3 to 8, reference numeral 15 designates a ventilator device for a vehicle according to the invention. The device comprises a plastic ventilation frame 18 and a frame-like valve member 20 made of rubber. The ventilation frame 18 includes a shutter-like grille 16 and a side wall 17. The valve member 20 is mounted on the rear end of the side wall 17 and includes check valves 19 for exhausting air from the vehicle interior to the outside of the vehicle through the grille 16.

The grille 16 projects like a flange from the outer periphery of the side wall 17. The grille 16 has an opening, in which a plurality of thin strip-like horizontal fins 21 are provided in a vertical row at predetermined intervals. The fins 21 are inclined downwardly toward the front.

The side wall 17 has a rectangular sectional profile and is open at the front and rear ends. It has a partition wall 17' provided at a vertically intermediate position to partition its inner space. The outer periphery of the side wall 17 adjacent to the rear end thereof is formed with a groove-like shallow recess 22. The top wall of the side wall 17 is provided with an elastic pawl 23 which extends obliquely upwardly toward the rear end of the grille 16. The bottom of the side wall 17 is provided with a lock projection 24 facing the rear end of the grille 16.

The valve member 20 accommodates check valves 19 which are disposed in the respective upper and lower spaces of the side wall 17. Each of the check valves 19 is bill-shaped and projects toward the grille 16. It consists of opposite side flap-like valve pieces 19a arranged in a V-shaped form in a closed state. The two valve pieces 19a meet in substantially line contact, and a minimum area of contact is involved. The rear end of the valve member 20 is provided with a substantially channel-shaped portion 25 in which the rear end of the side wall 17 is received. The end of the channel-shaped portion 25 is provided with an inward projection 26 which is received in the recess 22 provided adjacent to the rear end of the side wall 17.

Figure 4:
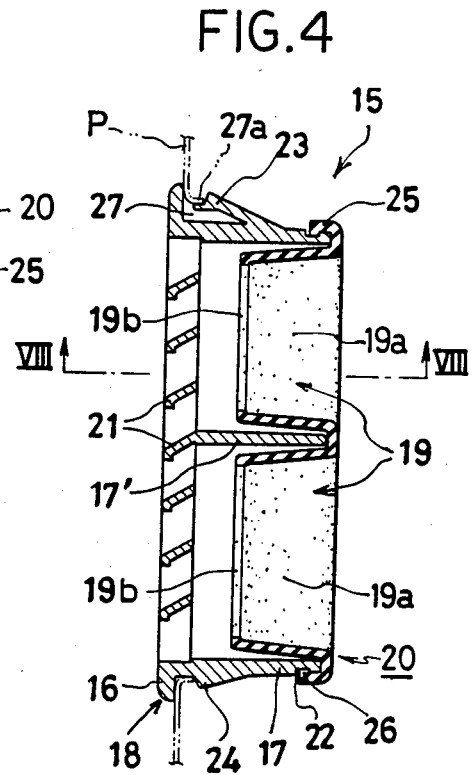
FIG. 4 is a sectional view showing the ventilator device of FIG. 3 in an assembled state.
Figure 5:
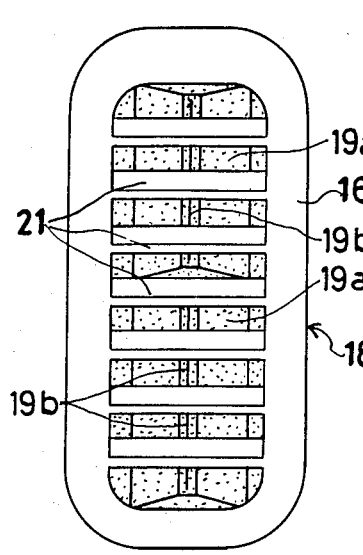
FIG. 5 is a plan view showing the ventilator device of FIG. 3.
Figure 6:
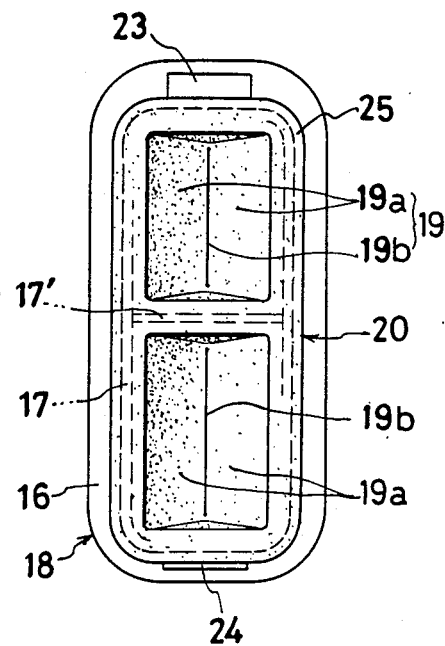
FIG. 6 is a back view showing the ventilator device of FIG. 3.
Figure 7:
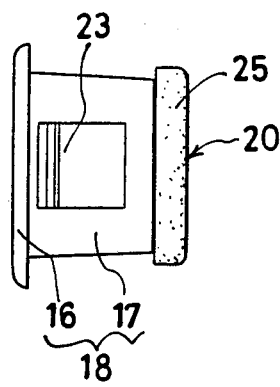
FIG. 7 is an end view showing the ventilator device of FIG. 3.
Figure 8:
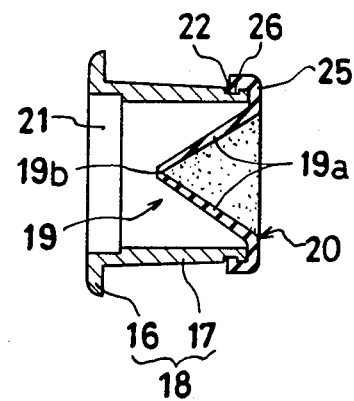
FIG. 8 is a sectional view taken along line VIII—VIII in FIG. 4.

The ventilation frame 18 and valve member 20 can be assembled together by fitting the channel-shaped portion 25 of the valve member 20 on the rear end of the side wall 17 of the ventilation frame 18 and then pushing the valve member 20 into the ventilation frame 18. When the valve member 20 is pushed, the projection 26 of the channel-shaped portion 25 engages the outer periphery of the side wall 17, so that the channel-shaped portion 25 is slightly expanded due to its elasticity. Eventually, the projection 26 comes to and is snappingly engaged in the recess 22 of the side wall 17. In this way, the open rear end of the side wall 17 is closed by the valve member 20 (FIG. 4).

Figure 9:
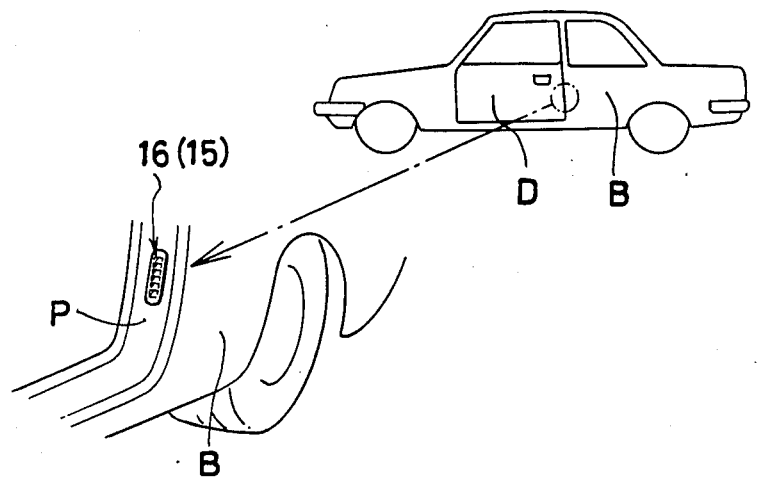
FIG. 9 is a view showing an example of the mounting position of the ventilator device.
Figure 10:
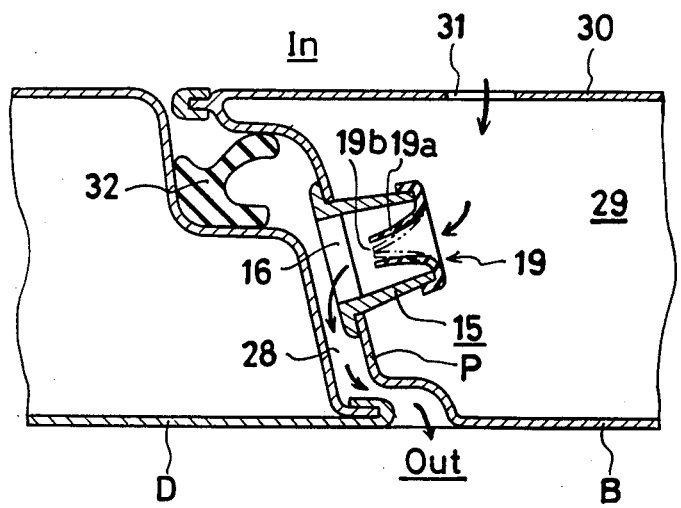
FIG. 10 is a sectional view for explaining the operation of the ventilator device in the mounted state.

The ventilator device 15 assembled in the above way is secured to a door pillar P of a vehicle, as shown in FIGS. 9 and 10. More specifically, the door pillar P is formed with a mounting hole 27, as shown in FIG. 4, so that the side wall 17 of the ventilator device 15 can be received in the hole 27. The portion of the door pillar P constituting the edges of the mounting hole 27 is bent inwardly. Then, the side wall 17 is inserted from its rear end into the mounting hole 27 of the door pillar P. When the side wall 17 is inserted through the mounting hole 27, the elastic pawl 23 and lock projection 24 of the side wall 17 engage with the edges of the hole, and the elastic pawl 23 is inwardly flexed as the side wall proceeds through the hole. Eventually, the bent rear end 27a of the door pillar defining the mounting hole engages with the elastic pawl 23 and lock projection 24, thus securing the ventilator device 15 in the mounting hole 27 of the door pillar P in co-operation with the rear end of the grille 18.

In this state, the grille 16 of the ventilator device 15 is exposed to the outside of the vehicle in a gap 28 between the door pillar P and a door D, as shown in FIG. 10. Also, the rear end of the ventilator device 15 is open to the interior of the door pillar P and communicates with the interior of the vehicle through a side grille 31 provided on an inner panel 30.

In FIGS. 9 and 10, reference symbol B designates a body panel and reference numeral 32 denotes a weather strip for closing the gap 28 between the door pillar P and the door D.

The operation of this ventilator device will now be described. Normally, a slit 19b of each bill-shaped check valve 19 is closed to prevent rainwater, dust and external air from entering the interior of the vehicle. Particularly, a high waterproof effect can be obtained since the slit 19b of the check valve 19 is located at a higher level than the lower side of the side wall 17. Further, the slit 19b is closed firmly when an external pressure is applied so that it is possible to obtain high air tightness during running of the vehicle.

When the door D is closed, the pressure in the interior In of the vehicle becomes higher than the outside pressure so that the slit 19b of the bill-shaped check valve 19 is opened to exhaust air from the interior In of the vehicle to the outside Out.

In the illustrated embodiment, the two valve pieces 19a of each check valve 19 are in linear contact with each other in a V-shaped sectional profile of the valve, thus minimizing the contact area. Thus, even in case where water drops attach to and freeze on the slit 19b the two valve pieces 19a can be readily separated by pressure. Thus, the ventilator device according to the invention is suited for use in a cold district.

Further, while the rear end of the side wall 17 is provided with the recess 22 and the channel-shaped portion 25 of the valve member 20 with the projection 26, this is by no means limitative, and it is possible to interchange the positions of the recess and projection. Further, it is possible to provide the recess and projection only along part of the periphery.

As has been described in the foregoing, according to the invention it is possible to provide a ventilator device for a vehicle which enables reduction of the number of components and can be quickly assembled by a single action without need for any particular tool for the assembly.

Further, since the check valve 19 is bill-shaped, increased air tightness can be obtained compared with the prior art devices using flaps. The check valve will not be opened by tilting of the vehicle, and the device can operate reliably even in a cold district.

What is claimed is:

1. A two-piece venilator device for use in connection with a vehicle comprising a ventilation frame including a shutter-like grille and a sidewall rearwardly extending from said grille and a one-piece molded frame-like valve member mounted in said side wall and including a check valve for exhausting air from the vehicle to the outside thereof through said grille, wherein:

said valve member has a bill-shaped check valve projecting toward said grille, and an end of the periphery of said valve member and an end of said side wall are provided with respective engagement means for snappingly engaging with each other.

2. The ventilator device for a vehicle according to claim 1, wherein said bill-shaped check valve consists of a pair of valve pieces arranged to define a V-shaped sectional profile and in linear contact with each other.

3. The ventilator device for a vehicle according to claim 1, wherein said engagement means consist of a projection provided on said valve member and a recess provided on said side wall.

* * * * *